US012804344B2

(12) United States Patent
Sun et al.

(10) Patent No.: US 12,804,344 B2
(45) Date of Patent: Nov. 17, 2026

(54) METHOD, APPARATUS, AND SYSTEM FOR OPTIMIZING IN-CABIN SOUND FIELD, AND READABLE STORAGE MEDIUM

(71) Applicant: AAC Microtech (Changzhou) Co., Ltd., Changzhou City (CN)

(72) Inventors: Shuyuan Sun, Changzhou (CN); Yiming Meng, Changzhou (CN); Xin Zhang, Changzhou (CN)

(73) Assignee: AAG Microtech (Changzhou) Co., Ld., Changzhou City (CN)

( * ) Notice: Subject to any disclaimer, the term of this patent is extended or adjusted under 35 U.S.C. 154(b) by 120 days.

(21) Appl. No.: 19/048,817

(22) Filed: Feb. 7, 2025

(65) Prior Publication Data

US 2026/0129389 A1 May 7, 2026

Related U.S. Application Data

(63) Continuation of application No. PCT/CN2024/130070, filed on Nov. 6, 2024.

(51) Int. Cl.
*H04S 7/00* (2006.01)
*H04R 1/02* (2006.01)

(52) U.S. Cl.
CPC ................. *H04S 7/30* (2013.01); *H04R 1/02* (2013.01); *H04R 2499/13* (2013.01)

(58) Field of Classification Search
CPC ........ H04S 7/30; H04S 7/302; H04S 2400/11; H04R 1/02; H04R 2499/13
USPC .......... 381/86, 150, 386, 389, 303, 304, 300
See application file for complete search history.

(56) References Cited

U.S. PATENT DOCUMENTS 4,953,219 A * 8/1990 Kasai ...................... H04S 1/002 381/86
6,038,325 A * 3/2000 Yoshida .................. H04R 5/02 381/71.4

* cited by examiner

*Primary Examiner* — Thjuan K Addy
(74) *Attorney, Agent, or Firm* — Wlersch Law Group

(57) ABSTRACT

Disclosed are a method, an apparatus, and a system for optimizing an in-cabin sound field, and a readable storage medium, which are applied to a sound control system of a target vehicle. The method includes: obtaining, upon detecting that a warning object appears in a caution zone corresponding to the target vehicle, a relative position parameter between the warning object in the caution zone and the target vehicle; reconstructing a sound field in the cabin of the target vehicle based on the relative position parameter to obtain a corresponding target chime source file; and outputting a corresponding audio control signal to each of the loudspeakers based on the target chime source file. Through implementation of the disclosure, an in-cabin passenger may easily know the orientation and movement information of a warning object via a 3D chime emitted by the sound control system.

9 Claims, 6 Drawing Sheets

METHOD, APPARATUS, AND SYSTEM FOR OPTIMIZING IN-CABIN SOUND FIELD, AND READABLE STORAGE MEDIUM

FIELD

The present disclosure relates to sound field control, and more particularly relates to a method, an apparatus, and a system for optimizing an in-cabin sound field, and a readable storage medium.

BACKGROUND

With advancement in automobile cabin intelligence, users and the market pose new requirements on automobiles in aspects of visual sense, auditory sense, and tactile sense. Chiming is an important function of an automobile sound system. In conventional technologies, a majority of fossil-fueled vehicles still use a conventional audio play control solution that generally features playing back a sound via an interior loudspeaker at a fixed position with a fixed sound source and a fixed configuration parameter once a vehicle warning signal is triggered, which can only play a limited warning role but cannot acoustically reflect position information and movement feature of a warning object.

To address this issue, some new-energy vehicles adopt a 3D-chime solution, i.e., once a vehicle warning signal is triggered, alert demands in different scenarios may be handled using an alterable audio source or handled by controlling sound reproduction sequence of different loudspeakers in the vehicle cabin. However, this 3D-chime solution can only alleviate the above issue to a limited extent, which cannot faithfully reflect position information and movement feature of a warning object in real time, so that the acoustic experience offered thereby is till unsatisfactory.

SUMMARY

The disclosure provides a method, an apparatus, and a system for optimizing an in-cabin sound field, and a readable storage medium, which can at least solve a problem in conventional technologies that a chime of a vehicle sound system cannot faithfully reflect position information and movement feature of a warning object in real time.

In a first aspect of the implementations of the disclosure, there is provided a method for optimizing an in-cabin sound field, which is applied to a sound control system of a target vehicle, the sound control system being configured with a plurality of loudspeakers that are installed at different positions in a cabin of the target vehicle, wherein the method for optimizing an in-cabin sound field comprises:

obtaining, upon detecting that a warning object appears in a caution zone corresponding to the target vehicle, a relative position parameter between the warning object in the caution zone and the target vehicle, wherein the relative position parameter reflects an orientation attribute and a distance attribute between the warning object and the target vehicle;

reconstructing a sound field in the cabin of the target vehicle based on the relative position parameter to obtain a corresponding target chime source file;

and outputting a corresponding audio control signal to each of the loudspeakers based on the target chime source file, wherein the audio control signal imparts a corresponding acoustic property to a chime emitted by a corresponding one of the loudspeaker so as to create, in the target vehicle, a sound field which reflects position and movement direction of the warning object, wherein an indicator of the acoustic property includes at least one of phase, amplitude, and frequency.

In a second aspect of the implementations of the disclosure, there is provided an apparatus for optimizing an in-cabin sound field, which is applied to a sound control system of a target vehicle, the sound control system being configured with a plurality of loudspeakers that are installed at different positions in a cabin of the target vehicle, wherein the apparatus for optimizing an in-cabin sound field comprises:

a parameter obtaining module configured to obtain, upon detecting that a warning object appears in a caution zone corresponding to the target vehicle, a relative position parameter between the warning object in the caution zone and the target vehicle, wherein the relative position parameter reflects an orientation attribute and a distance attribute between the warning object and the target vehicle;

a sound field reconstructing module configured to reconstruct a sound field in the cabin of the target vehicle based on the relative position parameter to obtain a corresponding target chime source file;

and a signal outputting module configured to output a corresponding audio control signal to each of the loudspeakers based on the target chime source file, wherein the audio control signal imparts a corresponding acoustic property to a chime emitted by a corresponding one of the loudspeaker so as to create, in the target vehicle, a sound field which reflects position and movement direction of the warning object, wherein an indicator of the acoustic property includes at least one of phase, amplitude, and frequency.

In a third aspect of the implementations of the disclosure, there is provided a sound control system, comprising: a memory, a processor, and a plurality of loudspeakers, wherein the loudspeakers are installed at different positions in a cabin of a target vehicle, respectively, each of the loudspeakers playing a chine based on a corresponding audio control signal, respectively; the processor is configured to execute a computer program stored on the memory; and the processor, when executing the computer program, carries out respective steps in the method for optimizing an in-cabin sound field provided in the first aspect of the implementations of the disclosure.

In a fourth aspect of the implementations of the disclosure, there is provided a computer-readable storage medium on which a computer program is stored, the computer program, when being executed by a processor, carries out respective steps in the method for optimizing an in-cabin sound field provided in the first aspect of the implementations of the disclosure.

In view of the above, the method, apparatus, and system for optimizing an in-cabin sound field and the readable storage medium provided according to the implementations of the disclosure enable obtaining, upon detecting that a warning object appears in a caution zone corresponding to the target vehicle, a relative position parameter between the warning object in the caution zone and the target vehicle, wherein the relative position parameter reflects an orientation attribute and a distance attribute between the warning object and the target vehicle; reconstructing a sound field in the cabin of the target vehicle based on the relative position parameter to obtain a corresponding target chime source file; and outputting a corresponding audio control signal to each of the loudspeakers based on the target chime source file, wherein the audio control signal imparts a corresponding acoustic property to a chime emitted by a corresponding one of the loudspeaker so as to create, in the target vehicle, a sound field which reflects position and movement direction of the warning object, wherein an indicator of the acoustic property includes at least one of phase, amplitude, and frequency. By implementing the solutions of this disclosure, the sound field in the target vehicle is reconstructed based on the relative position between the warning object and the target vehicle, and by tuning the operating indicators of the acoustic properties of each loudspeaker, a desired sound field is synthesized to generate a specified 3D chime, so that a driver may audibly know the position information and movement feature of the warning object via the chime, which provides more complete in-cabin alert functions and enhances user experience of vehicle acoustics.

DETAILED DESCRIPTION OF EMBODIMENTS

To make the objectives, features, and advantages of the disclosure more apparent and comprehensible, the technical solutions in the implementations of the disclosure will be described in a clear and comprehensive manner with reference to the accompanying drawings; it is apparent that the example implementations described herein are only part of the implementations of the disclosure, not all of them. All other implementations obtained by those skilled in the art based on the implementations described herein without exercise of inventive work would fall within the scope of protection of the disclosure.

In the description of the disclosure, it needs to be understood that the orientational or positional relationships indicated by the terms "length," "width," "center," "upper," "lower," "front," "rear," "left," "right," "vertical," "horizontal," "top," "bottom," "inner," "outer," and etc. are orientational and positional relationships based on the drawings, which are intended only for facilitating description of the disclosure and simplifying relevant illustrations, not for indicating or implying that the devices or elements compulsorily possess those specific orientations and are compulsorily configured and operated with those specific orientations; therefore, such terms should not be construed as limitations to the disclosure.

Besides, the terms "first" and "second" are only used for descriptive purposes, which shall not be construed as indicating or implying relative importance or implicitly indicating the quantity of a referred to technical feature. Therefore, the features limited by "first" and "second" may explicitly or implicitly include one or more of such features. In the implementations described herein, "plurality" indicates two or above, unless otherwise indicated.

In the disclosure, unless otherwise explicitly provided and limited, the terms such as "mount," "connect," "attach," and "fix" should be understood broadly, which, for example, may refer to a fixed connection, a detachable connection, or an integral connection; which may be a mechanical connection or an electrical connection; which may be a direct connection or an indirect connection via an intermediate medium; which may also be a communication between the insides of two elements or an interaction between two elements. To a person of normal skill in the art, specific meanings of the above terms in the disclosure may be construed dependent on specific situations.

To overcome a problem that chimes in a conventional car audio system fail to faithfully reflect position information and movement feature of a warning object in real time, a first implementation of the disclosure provides a method for optimizing an in-cabin sound field, which is applied to a sound control system of a target vehicle, the sound control system being configured with a plurality of loudspeakers that are installed at different positions in a cabin of the target vehicle, respectively.

Figure 1:
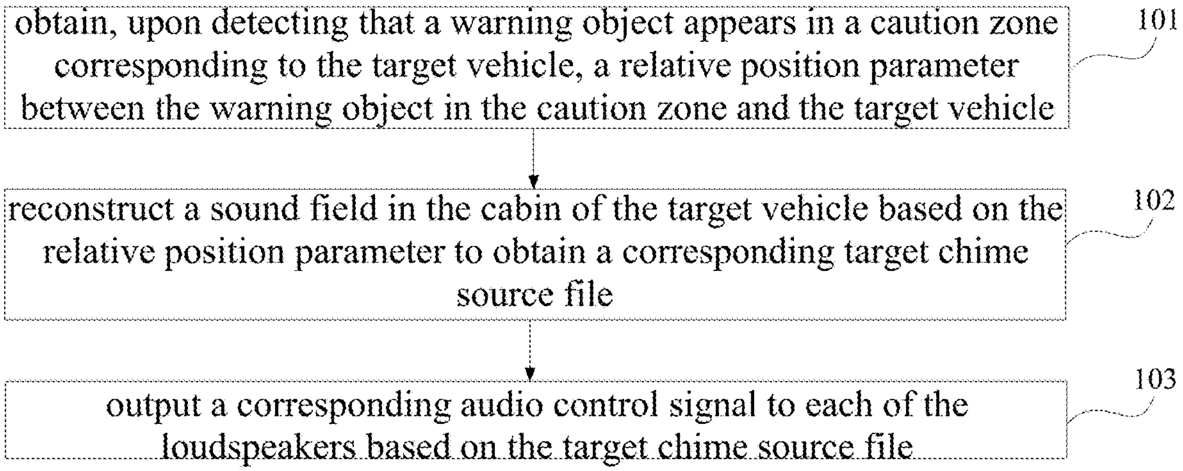
FIG. 1 is a basic flow diagram of a method for optimizing an in-cabin sound field according to a first implementation of the disclosure.

FIG. 1 illustrates a basic flow diagram of a method for optimizing an in-cabin sound field according to this implementation. The method for optimizing an in-cabin sound field comprises steps infra:

Step 101: a relative position parameter between a warning object in a caution zone and a target vehicle is obtained upon detecting that the warning object appears in the caution zone corresponding to the target vehicle.

Specifically, the relative position parameter reflects an orientational attribute and a distance attribute between the warning object and the target vehicle. The relative position parameter may be acquired via a sensor installed on a vehicle body. The sensor configured to acquire the relative position parameter includes, but is not limited to, an acoustic sensor, an optical sensor, a vibration sensor, a temperature sensor; this implementation can also obtain the relative position parameter in real time. In this implementation, the caution zone may be a dynamically alterable area that changes with the target vehicle. The warning object may be a vehicle, a pedestrian, or an obstacle, or alike, which is not limited here.

Step 102: a sound field in the cabin of the target vehicle is reconstructed based on the relative position parameter to obtain a corresponding target chime source file.

Specifically, a sound field reconstruction process may be carried out by a vehicle-mounted audio domain controller through computation, i.e., steps such as receiving the relative position parameter and computing a parameter of sound field reconstruction may be carried out by a control unit in the audio domain controller. The audio domain controller may be a standalone audio domain controller (e.g., a standalone vehicle-mounted audio power amplifier), an integrated audio domain controller (e.g., an on-board host computer SoC), or a distributed audio domain controller (e.g., a loudspeaker module comprising a plurality of active loudspeakers), which is not limited here. The audio domain controller may receive the relative position parameter via an on-board bus, the on-board bus including, but being not limited to, a CAN bus, a LIN bus, a FlexRay bus, a MOST bus, CAN FD, on-board Ethernet, UART, and etc.

In this implementation, the chime source file is an audio file for producing a 3D chime, which may be usually stored in a digital audio format (e.g., WAV, MP3, or a proprietary format), including audio data matching a movement status and a movement direction of the warning object and an environmental condition of the target vehicle. The chime audio file is used to produce a corresponding stereoscopic sound effect so that a driver/passenger is also auditorily informed of such information as position and movement direction of the warning object.

Step 103: a corresponding audio control signal is outputted to each of the loudspeakers based on the target chime source file.

Specifically, in this implementation, the audio control signal is used to impart a corresponding acoustic property to a chime emitted by a corresponding loudspeaker so that a sound field reflecting position and movement direction of the warning object is created in the target vehicle, an indicator of the acoustic property including at least one of phase, amplitude, and frequency.

In some examples of this implementation, the warning object is a further vehicle entering the caution zone; the step of obtaining, upon detecting that a warning object appears in a caution zone corresponding to the target vehicle, a relative position parameter between the warning object in the caution zone and the target vehicle comprises: obtaining, upon detecting that the warning object appears in the caution zone corresponding to the target vehicle, positioning information of the target vehicle and sampling position parameter of the further vehicle within a preset time period; predicting a movement trajectory of the further vehicle based on the sampling position parameter; and determining a relative position parameter between the further vehicle and the target vehicle at any time within an early-warning time period based on the position information and the movement trajectory, where the early-warning time period is a time period experienced by the further vehicle from entering the caution zone to leaving the caution zone, the early-warning time period being longer than the preset time period.

Specifically, the movement trajectory of the warning object may be fitted by sampling position information of the warning object within a short time period (i.e., the preset time period), and then the relative position parameter of the warning object in any time period within the caution zone may be determined. In some specific examples, image data of the caution zone may be continuously captured to identify, track, and analyze a movement change pattern of the warning object using an image processing algorithm, whereby the movement trajectory of the warning object is fitted. More specifically, the algorithm used in predicting the movement trajectory of the warning object may adopt the Kalman filter algorithm or the optical flow method, which is not limited here. Of course, in some examples, a sensor may be directly controlled to acquire a position parameter of the warning object in real time and feed the position parameter back to the audio domain controller in real time, whereby the relative position parameters of the warning object at different times are obtained to update the chime source file in real time.

In some examples of this implementation, the step of reconstructing a sound field in the cabin of the target vehicle based on the relative position parameter to obtain a corresponding target chime source file comprises: fitting acoustic characteristics of an acoustic response of the warning object in a target sound field in the cabin of the target vehicle and an acoustic response in an ideal sound field based on the relative position parameter to determine a target transfer function acting on a digital filter of each of the loudspeakers, in an acoustic environment of the ideal sound field includes at least one of an anechoic chamber, a listening room, a reverberation chamber; and updating the target transfer function to a chime source file corresponding to the sound control system to obtain the target chime source file.

Specifically, in this implementation, the acoustic environment of the ideal sound field refers to an acoustic environment satisfying certain acoustic characteristic indicator requirements. In this implementation, the acoustic environment of the ideal sound field includes, but is not limited to, an anechoic chamber, a listening room, a reverberation chamber, and a dedicated acoustic lab or environment simulating some preset scenes. The fitting of the acoustic characteristics refers to simulating, in terms of acoustic response, position and movement condition of the warning object in the acoustic environment of the ideal sound field based on a physical in-cabin environment so as to minimize difference between the acoustic response corresponding to the target sound field in the cabin and the acoustic response corresponding to the ideal sound field.

Furthermore, in some examples of this implementation, a first acoustic response corresponding to the target sound field is expressed as:

$$S(x_m, y_m)\sum_{n=1}^{N}[H_F(n, m)\cdot H_S(n)\cdot H_T(n)]$$

where S denotes an acoustic property indicator corresponding to the audio control signal; $(x_m, y_m)$ denotes the relative position parameter between the warning object and the target vehicle; $H_F(n, m)$ denotes the target transfer function acting on a digital filter of the nth loudspeaker when the relative position between the warning object and the target vehicle is $(x_m, y_m)$; $H_S(n)$ denotes an acoustoelectric transformation transfer function of the nth loudspeaker, a magnitude of which depends on a physical property of the corresponding loudspeaker; $H_T(n)$ denotes the acoustic transfer function from the nth loudspeaker to a target listening position, a magnitude of which is determined by an actual environment factor of the sound field in the cabin of the target vehicle; and N denotes the number of loudspeakers in the cabin of the target vehicle.

Furthermore, in some examples of this implementation, after the step of outputting a corresponding audio control signal to each of the loudspeakers based on the target chime source file, the method for optimizing an in-cabin sound field further comprises: computing, based on the first acoustic response of the target sound field, a second acoustic response corresponding to a chime actually received at the target listening position, where the second acoustic response is applied to optimize a generation model of the audio control signal in the target chime source file, the second acoustic response being expressed as:

$$S_{Driver}(t)=\sum_{m=0}^{M}\left\{\left[S(x_m, y_m)\sum_{n=1}^{N}[H_F(n, m)\cdot H_S(n)\cdot H_T(n)]\right]\cdot\delta(t-mT_s)\right\}$$

where t denotes time; $S_{Driver}(t)$ denotes the second acoustic response corresponding to time t; $\delta(t)$ denotes a unit sample sequence or a unit impulse sequence:

$$\delta(t)=\begin{cases}1, & t=0\\ 0, & t\neq 0\end{cases};$$

M denotes a sample number reference value, and m denotes a variable of a SUM function, $m\in[\mathbf{0}, M]$; $T_s$ denotes a sampling cycle;

$$M=\frac{T}{T_s}-1,$$

where T denotes the time period experienced by the warning object from entering the caution zone to leaving the caution zone.

Specifically, based on the examples of this implementation described supra, an actual effect of the 3D chime at the target listening position may be analyzed through computing the second acoustic response during the product design stage, which can facilitate developers in designing the chime source file to achieve a better 3D warning effect.

Figure 2:
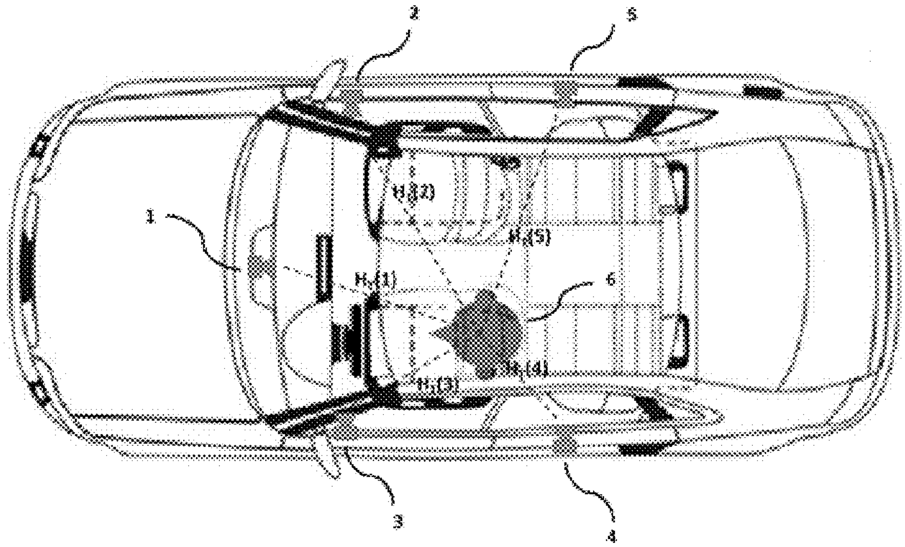
FIG. 2 is a layout schematic diagram of interior loudspeakers according to the first implementation of the disclosure.

Furthermore, in some examples of this implementation, the sound control system is configured with five loudspeakers, as illustrated in FIG. 2, which include: loudspeaker 1 fixed in a console central area of in the cabin of the target vehicle, loudspeaker 2 fixed in a right front door area in the cabin of the target vehicle, loudspeaker 3 fixed in a left front door area in the cabin of the target vehicle, loudspeaker 4 fixed in a left rear door area in the cabin of the target vehicle, and loudspeaker 5 fixed in a right rear door area in the cabin of the target vehicle; letting a driver position be the target listening position 6, the acoustic response to the chime signal received at the target listening position may be expressed as:

$$S\cdot[H_F(1)\ \ H_F(2)\ \ H_F(3)\ \ H_F(4)\ \ H_F(5)]\cdot\begin{bmatrix}H_S(1)&0&0&0&0\\0&H_S(2)&0&0&0\\0&0&H_S(3)&0&0\\0&0&0&H_S(4)&0\\0&0&0&0&H_S(5)\end{bmatrix}\cdot[H_T(1)\ \ H_T(2)\ \ H_T(3)\ \ H_T(4)\ \ H_T(5)]^T$$

where $H_T(1)$, $H_T(2)$, $H_T(3)$, $H_T(4)$, and $H_T(5)$ denote acoustic transfer functions from loudspeaker 1, loudspeaker 2, loudspeaker 3, loudspeaker 4, and loudspeaker 5 to the target listening position 6, respectively. The transfer function refers to a ratio of the Laplace transform (or z-Transform) of a linear system response quantity (output quantity) to a Laplace transform of energizing quantity (input quantity) under a zero initial condition, which is denoted as H=Y/U, where Y indicates the Laplace transform of the output quantity, and U indicates the Laplace transform of the input quantity. $H_S(1)$, $H_S(2)$, $H_S(3)$, $H_S(4)$, and $H_S(5)$ denote denote the acoustoelectric transformation transfer functions of loudspeaker 1, loudspeaker 2, loudspeaker 3, loudspeaker 4, and loudspeaker 5, respectively. $H_F(1)$, $H_F(2)$, $H_F(3)$, $H_F(4)$, and $H_F(5)$ denote the transfer functions acting on the acoustic digital filters of loudspeaker 1, loudspeaker 2, loudspeaker 3, loudspeaker 4, and loudspeaker 5, respectively. $[\ ]^T$ denotes matrix transposition computation. $H_T(1)$, $H_T(2)$, $H_T(3)$, $H_T(4)$, and $H_T(5)$ are determined by the actual interior acoustic environment, which may be directly obtained by measurement or may be obtained by modeling through theoretical computation; $H_S(1)$, $H_S(2)$, $H_S(3)$, $H_S(4)$, and $H_S(5)$ are determined by physical properties of the corresponding loudspeakers per se, which may be obtained by directly measuring the loudspeakers or may be obtained by modeling through theoretical computation. The sound field reconstruction refers to real-time computing and updating the transfer functions $H_F(1)$, $H_F(2)$, $H_F(3)$, $H_F(4)$, and $H_F(5)$ applied on respective digital filters of the loudspeakers.

It may be understood that, in some other examples, the number of loudspeakers may also be set to two, three, four, six, or eight or the like, and the setup positions of the loudspeakers may be otherwise designed, which are not limited here.

In some examples of this implementation, the step of fitting acoustic characteristics of an acoustic response of the warning object in a target sound field in the cabin of the target vehicle and an acoustic response in an ideal sound field based on the relative position parameter to determine a target transfer function acting on a digital filter of each of the loudspeakers comprises: substituting the relative position parameter to a first target computation equation to compute the target transfer function acting on the digital filter of each of the loudspeakers, where the first target computation equation is expressed as:

$$[H_F(1,m)\ \ H_F(2,m)\ \ H_F(3,m)\ \ H_F(4,m)\ \ H_F(5,m)]=H(x_m,y_m)\begin{bmatrix}H_S(1)&0&0&0&0\\0&H_S(2)&0&0&0\\0&0&H_S(3)&0&0\\0&0&0&H_S(4)&0\\0&0&0&0&H_S(5)\end{bmatrix}^{-1}\begin{bmatrix}H_T(1)\\H_T(2)\\H_T(3)\\H_T(4)\\H_T(5)\end{bmatrix}^{-1}$$

where $H(x_m, y_m)$ denotes an acoustic transfer function from the warning object to a reference listening position in the ideal sound field.

Figure 3:
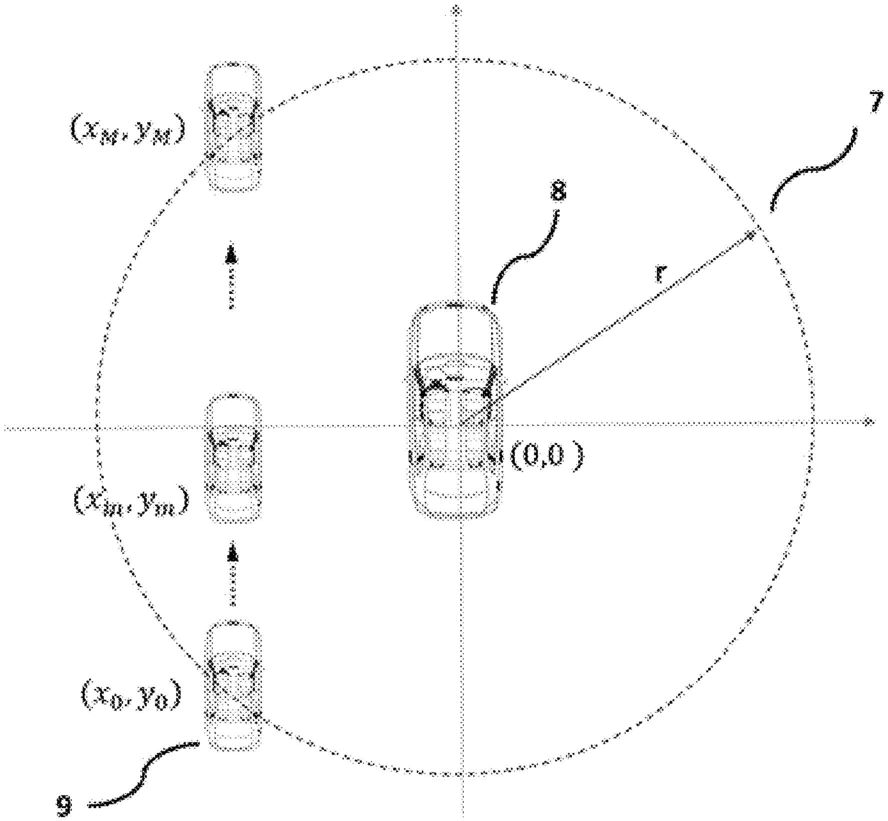
FIG. 3 is a schematic diagram of an application scenario of the method for optimizing an in-cabin sound field according to the first implementation of the disclosure.

Specifically, in a specific application scenario illustrated in FIG. 3, a coordinate system is established based on the target vehicle (in a driving status such as reversing, high-speed overtaking, lane changing), and a circular area with radius r and a target vehicle 8 as the circle center is defined to be a caution zone 7; when a warning object enters the caution zone 7, a vehicle chime is triggered to alert a passenger at the target listening position 6 in the cabin. With high-speed overtaking as an example, a coordinate system is used to characterize the relative position relationship between the warning object 9 and the target vehicle 8; letting the coordinates of the target vehicle 8 be constantly (0, 0), when the warning object 9 enters the caution zone 7, the coordinates of the warning object are $(x_0, y_0)$, so that the chime alert function of the target vehicle 8 is triggered; when the warning object 9 travels to the relative position with coordinates $(x_M, y_M)$, it drives out of the caution zone 7, then the chime alert function of the target vehicle 8 is closed.

In some specific examples, the relative position parameter $(x_m, y_m)$ of the warning object 9 in the caution zone 7 within any time period can be identified and captured by a sensor installed on the vehicle body of the target vehicle 8; the sensor may be an acoustic sensor, an optical sensor, a vibration sensor, or a temperature sensor, etc., which is not limited here. The movement trajectory of the warning object 9 from the relative position $(x_0, y_0)$ to the relative position $(x_M, y_M)$ may be captured by a vehicle-body sensor in real time and recorded into M+1 pieces of coordinate information to indicate the position information and movement feature of the warning object 9 at each time point during the active period of the chime function, given as:

$$M = \frac{T}{T_s} - 1$$

where T denotes the time (i.e., the early-warning time period noted supra) when the warning object 9 moves from the relative position ($x_0$, $y_0$) to the relative position ($x_M$, $y_M$); $T_S$ denotes the external information sampling interval or cycle of the sensor on the body of the target vehicle 8

Figure 4:
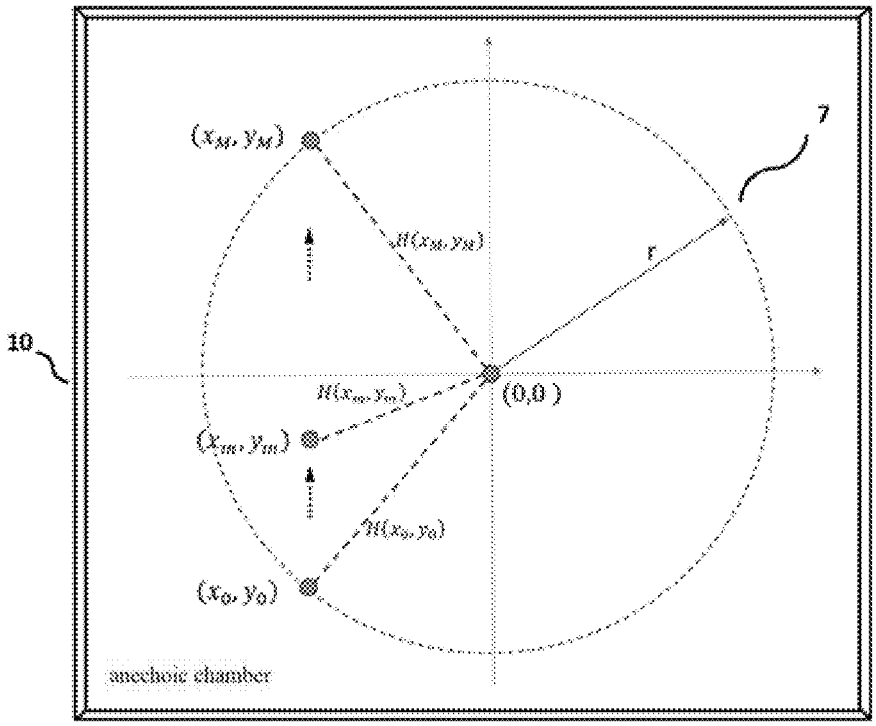
FIG. 4 is a schematic model diagram of in-cabin sound field reconstruction according to the first implementation of the disclosure.

Furthermore, with the anechoic chamber as an example, as illustrated in FIG. 4, in the anechoic chamber 10, a scope of the caution zone 7 with the coordinates (0, 0) as the central point and a radius r is simulated in the anechoic chamber 10; when the warning object moves from the relative position ($x_0$, $y_0$) through the relative position ($x_m$, $y_m$) to the relative position ($x_M$, $y_M$) in the anechoic chamber while emitting chimes, the acoustic responses to the chime signals of different positions received at the central point (0, 0) are expressed as:

$$S \cdot H(x_0, y_0)$$

$$S \cdot H(x_m, y_m)$$

$$S \cdot H(x_M, y_M)$$

where S denotes a preset acoustic property indicator (e.g., phase, frequency, amplitude, etc.) corresponding to the audio control signal; H ($x_0$, $y_0$), H($x_m$, $y_m$), and H($x_M$, $y_M$) denote the acoustic transfer functions from respective relative positions ($x_0$, $y_0$), ($x_m$, $y_m$), and ($x_M$, $y_M$) to the central point (0, 0) in the anechoic chamber 10, which may be obtained by directly measuring the actual acoustic environment in the anechoic chamber 10.

To allow for the chimes to reflect and differentiate the relative positions and the movement states of the warning object more apparently, S may be designed as a function of position information, denoted as S(x, y); S may be adjusted based on different positions of the warning object so as to change acoustic characteristics of the chimes such as phase, amplitude, and frequency, whereby acoustic responses to the chime signals of different positions received at the central point (0, 0) may be obtained:

$$S(x_0, y_0) \cdot H(x_0, y_0)$$

$$S(x_m, y_m) \cdot H(x_m, y_m)$$

$$S(x_M, y_M) \cdot H(x_M, y_M)$$

For the relative position ($x_m$, $y_m$) of the warning object at any time point, by fitting the acoustic response in the acoustic environment of the ideal sound field, a sound field reconstruction computation equation in an ideal state may be obtained below:

$$S(x_m, y_m) \cdot [H_F(1)\ \ H_F(2)\ \ H_F(3)\ \ H_F(4)\ \ H_F(5)] \cdot \begin{bmatrix} H_S(1) & 0 & 0 & 0 & 0 \\ 0 & H_S(2) & 0 & 0 & 0 \\ 0 & 0 & H_S(3) & 0 & 0 \\ 0 & 0 & 0 & H_S(4) & 0 \\ 0 & 0 & 0 & 0 & H_S(5) \end{bmatrix} \cdot [H_T(1)\ \ H_T(2)\ \ H_T(3)\ \ H_T(4)\ \ H_T(5)]^T = S(x_m, y_m) \cdot H(x_m, y_m)$$

Furthermore, by simplifying the sound field reconstruction computation equation, the first target computation equation may be obtained:

$$H(x_m, y_m) - [H_F(1)\ \ H_F(2)\ \ H_F(3)\ \ H_F(4)\ \ H_F(5)] \cdot \begin{bmatrix} H_S(1) & 0 & 0 & 0 & 0 \\ 0 & H_S(2) & 0 & 0 & 0 \\ 0 & 0 & H_S(3) & 0 & 0 \\ 0 & 0 & 0 & H_S(4) & 0 \\ 0 & 0 & 0 & 0 & H_S(5) \end{bmatrix} \cdot [H_T(1)\ \ H_T(2)\ \ H_T(3)\ \ H_T(4)\ \ H_T(5)]^T = 0$$

Furthermore, one solution corresponding to the transfer function acting on the digital filter of a loudspeaker may be determined:

$$[H_F(1, m)\ \ H_F(2, m)\ \ H_F(3, m)\ \ H_F(4, m)\ \ H_F(5, m)] = H(x_m, y_m) \begin{bmatrix} H_S(1) & 0 & 0 & 0 & 0 \\ 0 & H_S(2) & 0 & 0 & 0 \\ 0 & 0 & H_S(3) & 0 & 0 \\ 0 & 0 & 0 & H_S(4) & 0 \\ 0 & 0 & 0 & 0 & H_S(5) \end{bmatrix}^{-1} \begin{bmatrix} H_T(1) \\ H_T(2) \\ H_T(3) \\ H_T(4) \\ H_T(5) \end{bmatrix}^{-1}$$

where $H_F$(1,m) $H_F$(2,m) $H_F$(3,m) $H_F$(4, m) $H_F$(5,m) denote respective transfer functions acting on respective digital filters of the loudspeakers, which are correlated to the current relative position ($x_m$, $y_m$) of the warning object and updated in real time based on the relative position ($x_m$, $y_m$). $[\ ]^{-1}$ denotes inverse matrix computation.

Furthermore, in some examples of this implementation, after the step of substituting the relative position parameter to a first target computation equation, the method for optimizing an in-cabin sound field comprises: substituting the relative position parameter to a second target computation equation to compute the target transfer function acting on the digital filter of each of the loudspeakers in a case that a solution of the first target computation equation is not unique, where the second target computation equation is expressed as:

$$\text{Min}\left\{\left\| H(x_m, y_m) - [H_F(1)\ \ H_F(2)\ \ H_F(3)\ \ H_F(4)\ \ H_F(5)] \cdot \begin{bmatrix} H_S(1) & 0 & 0 & 0 & 0 \\ 0 & H_S(2) & 0 & 0 & 0 \\ 0 & 0 & H_S(3) & 0 & 0 \\ 0 & 0 & 0 & H_S(4) & 0 \\ 0 & 0 & 0 & 0 & H_S(5) \end{bmatrix} \cdot \right.\right.$$

-continued $$\left.[H_T(1)\ \ H_T(2)\ \ H_T(3)\ \ H_T(4)\ \ H_T(5)]^T\right\|\Bigg\}$$

where Min{ } denotes taking the minimum value, and || denotes vector modulus.

Specifically, in a case that the solution of the first target computation equation is not unique, the target transfer functions corresponding to each loudspeaker may be computed using the second target computation equation; the target transfer function obtained according to this computation manner better satisfies the requirements on convergence and implementability in acoustic filter design.

In contrast with conventional technologies, the method for optimizing an in-cabin sound field described in this implementation enables obtaining, upon detecting that a warning object appears in a caution zone corresponding to the target vehicle, a relative position parameter between the warning object in the caution zone and the target vehicle, where the relative position parameter reflects an orientation attribute and a distance attribute between the warning object and the target vehicle; reconstructing a sound field in the cabin of the target vehicle based on the relative position parameter to obtain a corresponding target chime source file; and outputting a corresponding audio control signal to each of the loudspeakers based on the target chime source file, where the audio control signal imparts a corresponding acoustic property to a chime emitted by a corresponding one of the loudspeaker so as to create, in the target vehicle, a sound field which reflects position and movement direction of the warning object, where an index of the acoustic property includes at least one of phase, amplitude, and frequency. By implementing the solution of this disclosure, a specified 3D chime is generated by reconstructing the sound field in the target vehicle based on the relative position between the warning object and the target vehicle, so that a driver may audibly know the position information and movement feature of the warning object via the chime, which provides more complete in-cabin alert functions and enhances user experience of vehicle acoustics. Moreover, the acoustic response computation method in this implementation also enables analysis of an actual 3D chime effect in the product design stage, assisting a developer in designing a chime source file.

It should be understood that, the specific sequential numbers of respective steps in this implementation do not indicate absolute execution sequences of the steps; the execution sequences of respective steps shall be determined based on their functions and inner logic, which shall not constitute a unique limitation to the execution process of the implementations of this disclosure.

Figure 5:
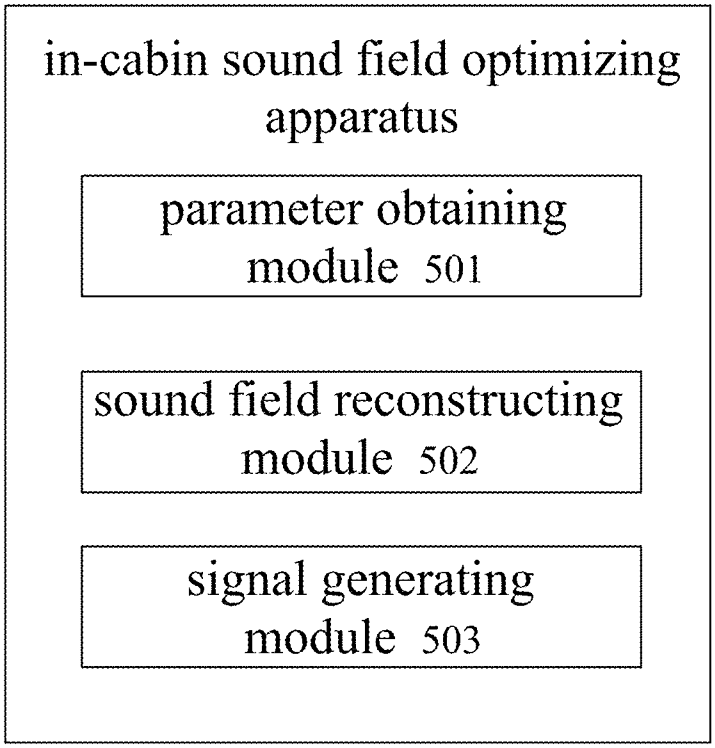
FIG. 5 is a schematic diagram of an apparatus for optimizing an in-cabin sound field according to a second implementation of the disclosure.

FIG. 5 is a schematic diagram of an apparatus for optimizing an in-cabin sound field according to a second implementation of the disclosure, which is applied to a sound control system of a target vehicle, the sound control system being configured with a plurality of loudspeakers that are installed at different positions in a cabin of the target vehicle. As illustrated in FIG. 5, the apparatus for optimizing an in-cabin sound field mainly comprises:

- a parameter obtaining module 501 configured to obtain, upon detecting that a warning object appears in a caution zone corresponding to the target vehicle, a relative position parameter between the warning object in the caution zone and the target vehicle, where the relative position parameter reflects an orientation attribute and a distance attribute between the warning object and the target vehicle;
- a sound field reconstructing module 502 configured to reconstruct a sound field in the cabin of the target vehicle based on the relative position parameter to obtain a corresponding target chime source file; and
- a signal outputting module 503 configured to output a corresponding audio control signal to each of the loudspeakers based on the target chime source file, where the audio control signal imparts a corresponding acoustic property to a chime emitted by a corresponding one of the loudspeaker so as to create, in the target vehicle, a sound field which reflects position and movement direction of the warning object, where an index of the acoustic property includes at least one of phase, amplitude, and frequency.

In some examples of this implementation, the warning object refers to a further vehicle entering the caution zone; correspondingly, the parameter obtaining module is specifically configured to: obtain, upon detecting that the warning object appears in the caution zone corresponding to the target vehicle, positioning information of the target vehicle and sampling position parameter of the further vehicle within a preset time period; predict a movement trajectory of the further vehicle based on the sampling position parameter; and determine a relative position parameter between the further vehicle and the target vehicle at any time within an early-warning time period based on the position information and the movement trajectory, where the early-warning time period is a time period experienced by the further vehicle from entering the caution zone to leaving the caution zone, the early-warning time period being longer than the preset time period.

In some examples of this implementation, the sound field reconstructing module, when performing the function of reconstructing a sound field in the cabin of the target vehicle based on the relative position parameter to obtain a corresponding target chime source file, is specifically configured to: fit acoustic characteristics of an acoustic response of the warning object in a target sound field in the cabin of the target vehicle and an acoustic response in an ideal sound field based on the relative position parameter to determine a target transfer function acting on a digital filter of each of the loudspeakers, where an acoustic environment of the ideal sound field includes at least one of an anechoic chamber, a listening room, a reverberation chamber; and update the target transfer function to a chime source file corresponding to the sound control system to obtain the target chime source file.

Furthermore, in some examples of this implementation, the sound field reconstructing module further comprises an acoustic response computation model, the acoustic response computation model is set with a first acoustic response corresponding to a target sound field, the first acoustic response being expressed as:

$$S(x_m, y_m)\sum_{n=1}^{N}[H_F(n, m)\cdot H_S(n)\cdot H_T(n)]$$

where S denotes an acoustic characteristic indicator corresponding to the audio control signal; $(x_m, y_m)$ denotes the relative position parameter between the warning object and the target vehicle; $H_F(n, m)$ denotes the target transfer function acting on a digital filter of the nth loudspeaker when the relative position between the warning object and the target vehicle is $(x_m, y_m)$; $H_S(n)$ denotes an acoustoelectric transformation transfer function of the nth loudspeaker, a magnitude of which depends on a physical property of the corresponding loudspeaker; $H_T(n)$ denotes the acoustic transfer function of the nth loudspeaker to a target listening position, a magnitude of which is determined by an actual environment factor of the sound field in the cabin of the target vehicle; and N denotes the number of loudspeakers in the cabin of the target vehicle.

Furthermore, in some examples of this implementation, the sound control system is configured with five loudspeakers, which are fixed in a console central area, in a right front door area, in a left front door area, in a left rear door area, and in a right rear door area in the cabin of the target vehicle, respectively; correspondingly, the sound field reconstructing module, when performing the function of fitting acoustic characteristics of an acoustic response of the warning object in a target sound field in the cabin of the target vehicle and an acoustic response in an ideal sound field based on the relative position parameter to determine a target transfer function acting on a digital filter of each of the loudspeakers, is specifically configured to: substitute the relative position parameter to a first target computation equation to compute the target transfer function acting on the digital filter of each of the loudspeakers, where the first target computation equation is expressed as:

$$[H_F(1,m)\ \ H_F(2,m)\ \ H_F(3,m)\ \ H_F(4,m)\ \ H_F(5,m)] = H(x_m, y_m)\begin{bmatrix} H_S(1) & 0 & 0 & 0 & 0 \\ 0 & H_S(2) & 0 & 0 & 0 \\ 0 & 0 & H_S(3) & 0 & 0 \\ 0 & 0 & 0 & H_S(4) & 0 \\ 0 & 0 & 0 & 0 & H_S(5) \end{bmatrix}^{-1} \begin{bmatrix} H_T(1) \\ H_T(2) \\ H_T(3) \\ H_T(4) \\ H_T(5) \end{bmatrix}^{-1}$$

where $H(x_m, y_m)$ denotes the acoustic transfer function from the warning object to a reference listening position in the ideal sound field.

Furthermore, in some examples of this implementation, the sound field reconstructing module, after performing the function of substituting the relative position parameter to the first target computation equation to compute, is specifically further configured to: substitute the relative position parameter to a second target computation equation to compute the target transfer function acting on the digital filter of each of the loudspeakers in a case that a solution of the first target computation equation is not unique, where the second target computation equation is expressed as:

$$\mathrm{Min}\left\{\left\| H(x_m, y_m) - [H_F(1)\ \ H_F(2)\ \ H_F(3)\ \ H_F(4)\ \ H_F(5)] \cdot \begin{bmatrix} H_S(1) & 0 & 0 & 0 & 0 \\ 0 & H_S(2) & 0 & 0 & 0 \\ 0 & 0 & H_S(3) & 0 & 0 \\ 0 & 0 & 0 & H_S(4) & 0 \\ 0 & 0 & 0 & 0 & H_S(5) \end{bmatrix} \cdot [H_T(1)\ \ H_T(2)\ \ H_T(3)\ \ H_T(4)\ \ H_T(5)]^T \right\|\right\}$$

-continued where Min{ } denotes taking a minimum value, and || denotes the vector modulus.

In some examples of this implementation, the apparatus for optimizing an in-cabin sound field further comprises an optimizing module, the optimizing module being configured to: after outputting a corresponding audio control signal to each of the loudspeakers based on the target chime source file, compute, based on the first acoustic response of the target sound field, a second acoustic response corresponding to a chime actually received at the target listening position, where the second acoustic response is applied to optimize a generation model of the audio control signal in the target chime source file, the second acoustic response being expressed as:

$$S_{Driver}(t) = \sum_{m=0}^{M}\left\{\left[S(x_m, y_m)\sum_{n=1}^{N}[H_F(n,m)\cdot H_S(n)\cdot H_T(n)]\right]\cdot\delta(t - mT_s)\right\}$$

where $S_{Driver}(t)$ denotes the second acoustic response corresponding to time t; $\delta(t)$ denotes a unit sample sequence or a unit impulse sequence:

$$\delta(t) = \begin{cases} 1, & t = 0 \\ 0, & t \neq 0 \end{cases};$$

M denotes a sample number reference value; m denotes taking a variable of SUM function, $m \in [0, M]$; $T_s$ denotes a sampling cycle;

$$M = \frac{T}{T_s} - 1,$$

where T denotes the time period experienced by the warning object from entering the caution zone to leaving the caution zone.

The apparatus for optimizing an in-cabin sound field provided according to this implementation enables obtaining, upon detecting that a warning object appears in a caution zone corresponding to the target vehicle, a relative position parameter between the warning object in the caution zone and the target vehicle, where the relative position parameter reflects an orientation attribute and a distance attribute between the warning object and the target vehicle; reconstructing a sound field in the cabin of the target vehicle based on the relative position parameter to obtain a corresponding target chime source file; and outputting a corresponding audio control signal to each of the loudspeakers based on the target chime source file, where the audio control signal imparts a corresponding acoustic property to a chime emitted by a corresponding one of the loudspeaker so as to create, in the target vehicle, a sound field which reflects position and movement direction of the warning object, where an index of the acoustic property includes at least one of phase, amplitude, and frequency. By implementing the solution of this disclosure, a specified 3D chime is generated by reconstructing the sound field in the target vehicle based on the relative position between the warning object and the target vehicle, so that a driver may audibly know the position information and movement feature of the warning object via the chime, which provides more complete in-cabin alert functions and enhances user experience of vehicle acoustics. Moreover, the acoustic response computation method in this implementation also enables analysis of an actual 3D chime effect in the product design stage, assisting a developer in designing a chime source file.

Figure 6:
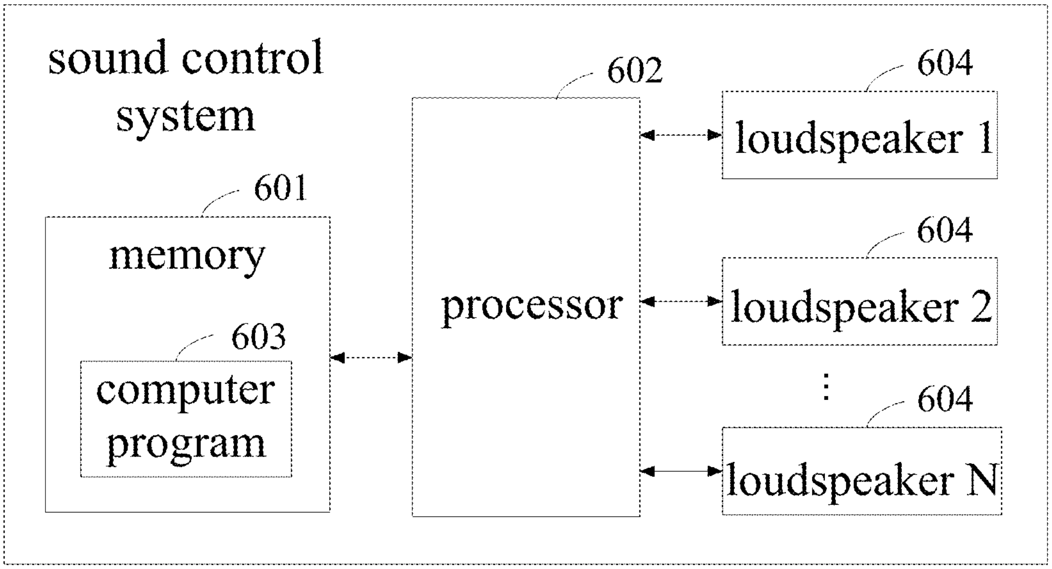
FIG. 6 is a structural schematic diagram of a system for optimizing an in-cabin sound field according to a third implementation of the disclosure.

FIG. 6 illustrates a sound control system according to a third implementation of the disclosure. The sound control system may be applied to implement the method for optimizing an in-cabin sound field described supra, mainly comprising: a memory 601, a processor 602, a computer program 603 stored on the memory 601 and executable on the processor 602, and a plurality of loudspeakers 604, each loudspeaker 604 being communicatively connected to the processor 602, the loudspeakers 604 being installed at different positions in a cabin of a target vehicle, each loudspeaker 604 being configured to play a chime based on a corresponding audio control signal, the memory 601 and the processor 602 being communicatively connected. The processor 602, when executing the computer program 603, carries out the method according to the first implementation. In the sound control system, one or more processors may be provided.

The memory 601 may be a high-speed RAM (Random Access Memory) or a non-volatile memory, e.g., a magnetic disk memory. The memory 601 is configured to store executable codes, the processor 602 being coupled to the memory 601.

Furthermore, implementations of the present disclosure further provide a computer-readable storage medium, which may be set in the sound control system; the computer-readable storage medium may be the memory in the implementation illustrated in FIG. 6.

The computer-readable storage medium has a computer program stored thereon, the program, when being executed by the processor, carries out the method for optimizing an in-cabin sound field in the implementation described supra. Furthermore, the computer-readable storage medium may also be various mediums that may store the computer program such as a U disk, an external hard disk, a ROM (Read-Only Memory), a RAM, a magnetic disk, or an optical disk.

In the several implementations described herein, it should be understood that the apparatus and the method as disclosed may also be otherwise implemented. For example, the apparatus implementation described supra is only schematic; for example, partition of modules is only a logic function partition, which may be altered in actual implementations; for example, a plurality of modules or components may be combined or may be integrated to another system; or some features may be omitted or not executed. Furthermore, the mutual coupling therebetween, or the direct coupling, or the communicative connection as disclosed or discussed may be implemented via some interfaces; the indirect coupling or communicative connection between devices or modules may be electrical, or mechanical, or the like.

The modules described as discrete parts may be physically separated or not physically separated; the parts illustrated as modules may be physical modules or not physical modules, i.e., they may be located at a same place or may be distributed on a plurality of network modules. Part or all of the modules may be selected to carry out the solution of this implementation dependent on actual needs.

Additionally, various functional modules in various implementations of the disclosure may be integrated on one processing module or may be standalone physical modules; or two or more modules are integrated on one module. The integrated module may be implemented in a hardware manner or in a form of software functional modules.

If the integrated module is implemented in a software functional module and sold or used as an independent product, it may be stored in a computer-readable storage medium. Based on this understanding, the essential technical solution of the present disclosure, or the part of the disclosure contributing to conventional technologies, or all or part of the technical solution may be embodied in a form of a software product; the computer software product is stored in a readable storage medium, comprising several instructions enabling a computer device (which may be a personal computer, a server, or a network device or the like) to carry out all or part of the steps of the method in respective implementations. The readable storage medium includes various mediums that may store program codes such as a U disk, an external hard disk, a ROM (Read-Only Memory), a RAM, a magnetic disk, or an optical disk.

It is noted that, for ease of description, the method implementation described supra is expressed as a combination of a series of actions; however, those skilled in the art shall know that, the present disclosure is not limited by the sequence of actions as described, because some steps may be performed in another sequence or performed simultaneously according to the disclosure. Secondly, those skilled in the art shall also know that, the implementations described herein are all exemplary, and not all actions and modules involved are essential to the disclosure.

The implementations noted supra focus on different aspects of the disclosure; for those parts not detailed in one implementation, they may refer to relevant descriptions in other implementations.

What have been described supra relate to the method for optimizing an in-cabin sound field, apparatus, system, and a readable storage medium provided by the present disclosure; to those skilled in the art, the specific implementations and application scopes may be altered according to the invention concept of the disclosure; therefore, the contents of the description shall not be construed as limitation to the disclosure.

We claim:

1. A method for optimizing an in-cabin sound field, which is applied to a sound control system of a target vehicle, the sound control system being configured with a plurality of loudspeakers that are installed at different positions in a cabin of the target vehicle, wherein the method for optimizing an in-cabin sound field comprises:

obtaining, upon detecting that a warning object appears in a caution zone corresponding to the target vehicle, a relative position parameter between the warning object in the caution zone and the target vehicle, wherein the relative position parameter reflects an orientation attribute and a distance attribute between the warning object and the target vehicle;

reconstructing a sound field in the cabin of the target vehicle based on the relative position parameter to obtain a corresponding target chime source file;

and outputting a corresponding audio control signal to each of the loudspeakers based on the target chime source file, wherein the audio control signal imparts a corresponding acoustic property to a chime emitted by a corresponding one of the loudspeaker so as to create, in the target vehicle, a sound field which reflects position and movement direction of the warning object, wherein an indicator of the acoustic property includes at least one of phase, amplitude, and frequency.

2. The method for optimizing an in-cabin sound field according to claim 1, wherein the reconstructing a sound field in the cabin of the target vehicle based on the relative position parameter to obtain a corresponding target chime source file comprises:

fitting acoustic characteristics of an acoustic response of the warning object in a target sound field in the cabin of the target vehicle and an acoustic response in an ideal sound field based on the relative position parameter to determine a target transfer function acting on a digital filter of each of the loudspeakers, wherein an acoustic environment of the ideal sound field includes at least one of an anechoic chamber, a listening room, a reverberation chamber;

and updating the target transfer function to a chime source file corresponding to the sound control system to obtain the target chime source file.

3. The method for optimizing an in-cabin sound field according to claim 2, wherein a first acoustic response corresponding to the target sound field is expressed as:

$$S(x_m, y_m)\sum_{n=1}^{N}[H_F(n, m)\cdot H_S(n)\cdot H_T(n)]$$

where S denotes an acoustic property indicator corresponding to the audio control signal; $(x_m, y_m)$ denotes the relative position parameter between the warning object and the target vehicle; $H_F(n, m)$ denotes the target transfer function acting on a digital filter of the nth loudspeaker when the relative position between the warning object and the target vehicle is $(x_m, y_m)$; $H_S(n)$ denotes an acoustoelectric transformation transfer function of the nth loudspeaker, a magnitude of which depends on a physical property of the corresponding loudspeaker; $H_T(n)$ denotes the acoustic transfer function from the nth loudspeaker to a target listening position, a magnitude of which is determined by an actual environment factor of the sound field in the cabin of the target vehicle; and N denotes the number of loudspeakers in the cabin of the target vehicle.

4. The method for optimizing an in-cabin sound field according to claim 3, wherein the sound control system is configured with five loudspeakers which are fixed in a console central area, in a right front door area, in a left front door area, in a left rear door area, and in a right rear door area in the cabin of the target vehicle, respectively;

the fitting acoustic characteristics of an acoustic response of the warning object in a target sound field in the cabin of the target vehicle and an acoustic response in an ideal sound field based on the relative position parameter to determine a target transfer function acting on a digital filter of each of the loudspeakers comprises:

substituting the relative position parameter to a first target computation equation to compute the target transfer function acting on the digital filter of each of the loudspeakers, wherein the first target computation equation is expressed as:

$$[H_F(1, m)\ H_F(2, m)\ H_F(3, m)\ H_F(4, m)\ H_F(5, m)] = H(x_m, y_m)\begin{bmatrix} H_S(1) & 0 & 0 & 0 & 0 \\ 0 & H_S(2) & 0 & 0 & 0 \\ 0 & 0 & H_S(3) & 0 & 0 \\ 0 & 0 & 0 & H_S(4) & 0 \\ 0 & 0 & 0 & 0 & H_S(5) \end{bmatrix}^{-1}\begin{bmatrix} H_T(1) \\ H_T(2) \\ H_T(3) \\ H_T(4) \\ H_T(5) \end{bmatrix}^{-1}$$

where H $(x_m, y_m)$ denotes an acoustic transfer function from the warning object to a reference listening position in the ideal sound field.

5. The method for optimizing an in-cabin sound field according to claim 4, further comprising after the substituting the relative position parameter to a first target computation equation:

substituting the relative position parameter to a second target computation equation to compute the target transfer function acting on the digital filter of each of the loudspeakers in a case that a solution of the first target computation equation is not unique, wherein the second target computation equation is expressed as:

$$\text{Min}\left\{\left\| H(x_m, y_m) - [H_F(1)\ H_F(2)\ H_F(3)\ H_F(4)\ H_F(5)]\cdot \begin{bmatrix} H_S(1) & 0 & 0 & 0 & 0 \\ 0 & H_S(2) & 0 & 0 & 0 \\ 0 & 0 & H_S(3) & 0 & 0 \\ 0 & 0 & 0 & H_S(4) & 0 \\ 0 & 0 & 0 & 0 & H_S(5) \end{bmatrix}\cdot [H_T(1)\ H_T(2)\ H_T(3)\ H_T(4)\ H_T(5)]^T \right\|\right\}$$

where Min{ } denotes taking a minimum value, and || denotes vector modulus.

6. The method for optimizing an in-cabin sound field according to claim 3, further comprising after outputting a corresponding audio control signal to each of the loudspeakers based on the target chime source file:

computing, based on the first acoustic response of the target sound field, a second acoustic response corresponding to a chime actually received at the target listening position, wherein the second acoustic response is applied to optimize a generation model of the audio control signal in the target chime source file, the second acoustic response being expressed as:

$$S_{Driver}(t) = \sum_{m=0}^{M}\left\{\left[S(x_m, y_m)\sum_{n=1}^{N}[H_F(n, m)\cdot H_S(n)\cdot H_T(n)]\right]\cdot \delta(t - mT_s)\right\}$$

where t denotes time; $S_{Driver}(t)$ denotes the second acoustic response corresponding to time t; $\delta(t)$ denotes a unit sample sequence or a unit impulse sequence:

$$\delta(t) = \begin{cases} 1, & t = 0 \\ 0, & t \neq 0 \end{cases};$$

M denotes a sample number reference value; $T_s$ denotes a sampling cycle;

$$M = \frac{T}{T_s} - 1,$$

and T denotes the time period experienced by the warning object from entering the caution zone to leaving the caution zone.

7. The method for optimizing an in-cabin sound field according to claim 1, wherein the warning object is a further vehicle entering the caution zone;

and the obtaining, upon detecting that a warning object appears in a caution zone corresponding to the target vehicle, a relative position parameter between the warning object in the caution zone and the target vehicle, comprises:

obtaining, upon detecting that the warning object appears in the caution zone corresponding to the target vehicle, positioning information of the target vehicle and sampling position parameter of the further vehicle within a preset time period;

predicting a movement trajectory of the further vehicle based on the sampling position parameter;

and determining a relative position parameter between the further vehicle and the target vehicle at any time within an early-warning time period based on the position information and the movement trajectory, wherein the early-warning time period is a time period experienced by the further vehicle from entering the caution zone to leaving the caution zone, the early-warning time period being longer than the preset time period.

8. An apparatus for optimizing an in-cabin sound field, which is applied to a sound control system of a target vehicle, the sound control system being configured with a plurality of loudspeakers that are installed at different positions in a cabin of the target vehicle, wherein the apparatus for optimizing an in-cabin sound field comprises:

a parameter obtaining module configured to obtain, upon detecting that a warning object appears in a caution zone corresponding to the target vehicle, a relative position parameter between the warning object in the caution zone and the target vehicle, wherein the relative position parameter reflects an orientation attribute and a distance attribute between the warning object and the target vehicle;

a sound field reconstructing module configured to reconstruct a sound field in the cabin of the target vehicle based on the relative position parameter to obtain a corresponding target chime source file;

and a signal outputting module configured to output a corresponding audio control signal to each of the loudspeakers based on the target chime source file, wherein the audio control signal imparts a corresponding acoustic property to a chime emitted by a corresponding one of the loudspeaker so as to create, in the target vehicle, a sound field which reflects position and movement direction of the warning object, wherein an indicator of the acoustic property includes at least one of phase, amplitude, and frequency.

9. A sound control system, comprising a memory, a processor, and a plurality of loudspeakers, wherein:

the loudspeakers are installed at different positions in a cabin of a target vehicle, respectively, each of the loudspeakers playing a chine based on a corresponding audio control signal, respectively;

the processor is configured to execute a computer program stored on the memory;

and the processor, when executing the computer program, carries out respective steps in the method for optimizing an in-cabin sound field according to claim 1.

* * * * *